July 10, 1934.     H. FIEVET     1,965,922
APPARATUS FOR THE MANUFACTURE OF CAKES OF CARBONIC SNOW
Filed June 24, 1930
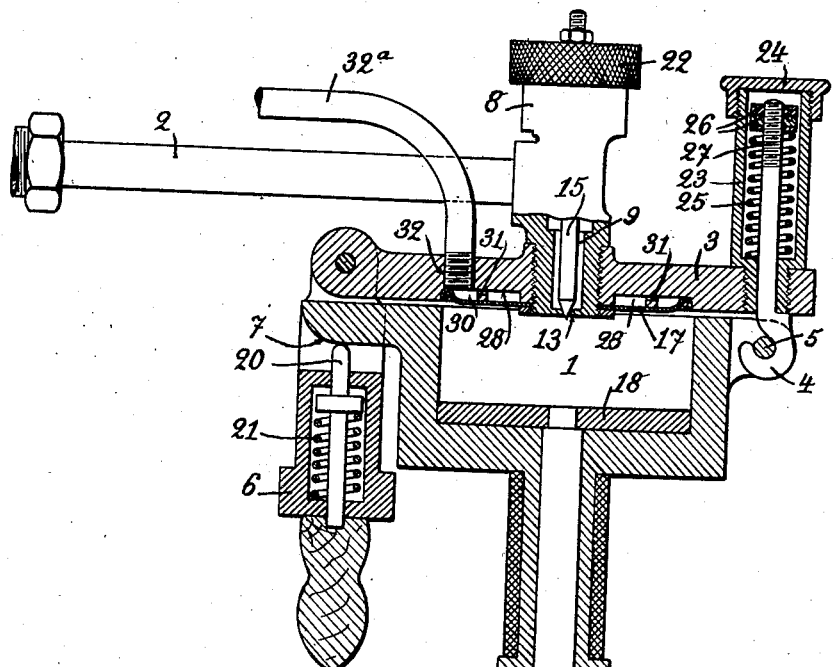
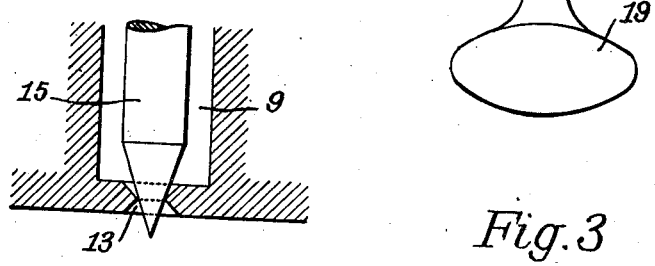
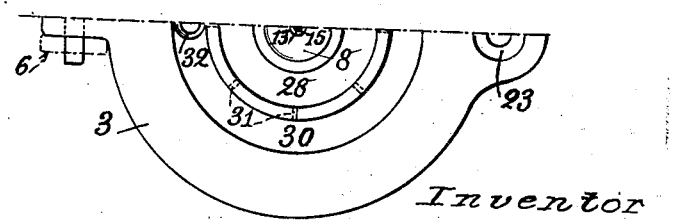
Inventor
H. Fievet,
By Markel Clark
Attys.

Patented July 10, 1934

1,965,922

UNITED STATES PATENT OFFICE 1,965,922

APPARATUS FOR THE MANUFACTURE OF CAKES OF CARBONIC SNOW

Henri Fievet, La Madeleine Les Lille, France

Application June 24, 1930, Serial No. 463,528
In France June 26, 1929

7 Claims. (Cl. 62—121)

The present invention has for object an apparatus for the manufacture of carbonic snow.

This apparatus comprises a vessel in which is provided an expansion chamber having one of its sides open and which is closed by a cover held in closed position by resilient means and which by the increase of volume of the snow formed, is lifted, thus indicating by the escape of gas the end of the operation at the same time as it gives absolute security against any explosion. Carbon dioxide enters the chamber through an orifice formed in a thin wall, provided at the center of the cover, with or without controlling valve or needle valve.

The liquid carbon dioxide, by expanding, is partly converted into snow, which is retained in the chamber by any filtering cloth through which passes the other portion in the form of gas, for escaping through grooves leading to one or more orifices provided in the cover, or in one of the walls. The chamber is held resiliently pressed under its cover by any mechanical device, so that if a dangerous pressure occurs within the chamber, owing to obstruction or from any other cause, this chamber moves away from the cover, allowing the gas to escape and thus avoiding any risk of explosion.

The gas exhaust orifice can be connected or not to a piping, to a gasometer, or to a pump for evacuating or recovering the gas escaping from the same.

The orifice provided in a thin wall and through which must pass the liquid carbon dioxide proceeding to the chamber, allows to obtain a regular and permanent outflow, without risk of obstruction by snow which might be formed in this portion of the apparatus.

The accompanying drawing illustrates, by way of example, a form of construction of the subject-matter of the invention.

Fig. 1 is a vertical section of the apparatus.

Fig. 2 is a section, on an enlarged scale, of the orifice formed in a thin wall and ensuring admission of the carbon dioxide, with its controlling needle valve.

Fig. 3 is a plan view of the grooves provided in the cover, collecting the carbon dioxide and conveying it towards a collecting conduit.

The apparatus comprises a removable and sufficiently resistant chamber 1. This chamber is closed by a cover 3 directly secured on the vessel containing the liquid carbon dioxide, or connected to this vessel by a rigid or flexible pipe line 2. This cover 3 is provided, for instance on one side, with a rocking lever 6 containing a spring 21 acting on a movable rod 20 which takes a bearing on an incline 7; on the other side, this cover has a movable hook 4 which engages under a pivot 5 integral with the chamber 1.

The hook 4 clamps the chamber 1 upon the cover 3, through the action of a spring 25 through which passes the stem 27 of the hook 4. The stem 27 of the hook 4 is guided in the cover by the neck portion of a cylindrical sheath 23 covered by a cap 24. The cylindrical sheath serves at the same time as protecting member for the spring.

The length of the stem 27 of the hook 4 is adjusted by two nuts 26 allowing, according to the direction in which they are caused to rotate to modify the clamping of the chamber 1 against the cover 3; this modification of clamping is effected in correspondence with that resulting from the spring 21 mounted in the handle of the rocking lever 6 securing the chamber to the other side of the cover. At the center of the cover is arranged a coupling or connection 8 on which is secured the pipe line 2. This connection is perforated with a passageway 9 terminating by an orifice 13 formed in a thin wall and the cross section of which can be controlled by means of a central needle valve 15 and of a knurled knob 22.

The cover 3 is provided with one or more concentric grooves 28—30 communicating together through radial grooves 31, as well as with an orifice 32 which can eventually receive a piping 32a leading to a gasometer, or to a pump, when it is desired to carry away or to recover the escaping carbon dioxide. On the inner wall of the cover is provided a disc 17 made of filtering material, such as felt, fabric, etc.

The bottom of the chamber 1 is eventually provided with a movable plate moved by a hand push-piece 19 for compressing, if necessary, the snow cake, once it is formed. According to requirements, the thrust can be effected by a screw or like press, and the snow chamber 1 can be held under the cover 3 by several resilient points of attachment.

The operation of the apparatus is as follows:

When carbon dioxide is led to the apparatus, it enters the chamber 1 through the channel 13 which is slightly divergent. This acid expands and is partly converted into carbon dioxide snow which deposits in the chamber, whilst the non-frozen carbon dioxide escapes through the grooves 28—30 and the orifice 32. The filter 17 prevents the escape of the snow particles which might be carried along by the gas.

At the end of a certain time, the admission of carbon dioxide is interrupted, the chamber 1 is released from the cover 3 by causing the lever 6 to rotate and by disengaging it from the hook 4; it is then found to be more or less filled with carbon dioxide snow.

If, previously to the opening, care is taken to exert pressure on the plate 18 by means of the push-piece 19, the snow will be given a greater or less consistency.

Once the chamber is released from the cover, the said plate and push-piece can facilitate the ejection of the snow cakes.

The resilient fixing in position of the chamber under the cover, effected in the example described by means of springs, constitutes a safety device, as if the pressure within the apparatus rises to an excessive degree, the chamber moves away from the cover and allows the gas to escape at its periphery.

This arrangement will also allow to easily ascertain if the cakes are finished. In fact, at this moment, their volume continues to increase, moves the chamber away from its cover and allows the gas to escape as above stated.

It is to be understood that the apparatus can be constructed with or without trapping of nonsolidified gas, with or without push-piece for compressing and ejecting the snow cakes. Besides, the escape of the nonsolidified gas can take place through the bottom of the chamber instead of being effected through the cover.

I claim:

1. In an apparatus for the manufacture of cakes of carbon dioxide snow by expansion of liquid carbon dioxide, the combination of a vessel in which is provided an expansion chamber having one of its sides open, a cover on this open side of the said expansion chamber, a pivot on one side of the said vessel, a hook resiliently connected to the cover and engaging with the said pivot, and connecting means on the side of the cover opposed to that carrying the said hook, adapted to resiliently press the said cover on the vessel.

2. In an apparatus for the manufacture of cakes of carbon dioxide snow by expansion of liquid carbon dioxide, the combination of a vessel in which is provided an expansion chamber having one of its sides open, a cover on this open side of the said expansion chamber, resilient means pivoted on one side of the said cover and adapted to resiliently press this cover on the said vessel, a sheath the neck portion of which is screwed in the said cover on the side opposed to the said pivoting means, a rod adapted to slide in the said sheath, this rod being screw threaded at its end which is located within the said sheath, nuts screwed on this threaded end of the said rod, a compression spring arranged between the said nuts and the neck portion of the said sheath, the other end of this rod being of hook shape, and a pivot on the said vessel, with which the said hook engages.

3. In an apparatus for the manufacture of cakes of carbon dioxide snow by expansion of liquid carbon dioxide, the combination of a vessel in which is provided an expansion chamber having one of its sides open, a cover on this open side of the said expansion chamber, a hook resiliently mounted on this cover, means on the said vessel for receiving this hook, a lever pivoted on the said cover on the side opposed to the said resilient hook, an incline on the edge of the said vessel opposite the said lever, and resilient means on this lever, adapted to cooperate with the said incline for pressing the cover on the vessel.

4. In an apparatus for the manufacture of cakes or carbon dioxide snow by expansion of liquid carbon dioxide, the combination of a vessel in which is provided an expansion chamber having one of its sides open, a cover on this open side of the said expansion chamber, a hook resiliently mounted on this cover, means on the said vessel for receiving this hook, a lever pivoted on the said cover, on the side opposed to the said hook, an incline on the edge of the said vessel opposite the said lever, a guide on this lever, a rod sliding in this guide and the end of which is adapted to cooperate with the said incline, and resilient means arranged on the lever for pushing the said rod against the said incline.

5. In an apparatus for the manufacture of cakes of carbon dioxide snow by expansion of liquid carbon dioxide, the combination of a vessel in which is provided an expansion chamber having one of its sides open, a cover on this open side of the said expansion chamber, resilient means adapted to connect the said cover to the said vessel, this cover having on its inner face circular concentric grooves and radial conduits and an exhaust orifice communicating with one of the said grooves.

6. In an apparatus for the manufacture of cakes of carbon dioxide snow by expansion of liquid carbon dioxide, the combination of a vessel in which is provided an expansion chamber having one of its sides open, a cover on this open side of the said expansion chamber, resilient means adapted to connect the said cover to the said vessel this cover having on its inner face circular concentric grooves and radial channels and an exhaust orifice communicating with one of the said grooves, a filtering plate placed on the said grooves and adapted to prevent the escape of the solidified portions of carbon dioxide.

7. In an apparatus for the manufacture of cakes of carbon dioxide snow, by expansion of liquid carbon dioxide, the combination of a vessel in which is provided an expansion chamber having one of its sides open, a cover on this open side of the said expansion chamber, resilient means adapted to connect the said cover to the said vessel, this cover having on its inner face circular concentric grooves and radial channels and an exhaust orifice communicating with one of the said grooves, a filtering element placed on the said grooves and adapted to prevent the escape of the solidified portions, of the carbon dioxide, an ejecting piston in the bottom of the said vessel, a rod on this piston, adapted to slide in an opening provided in the bottom of the said vessel and a handle on the said rod, the piston being adapted to be moved towards the cover and to eject the cake of carbon dioxide snow when it is formed.

HENRI FIEVET.